Apr. 17, 1923.

S. B. ISAACS

SPOON

Filed March 14, 1921

1,452,464

S. B. Isaacs
INVENTOR
BY Victor J. Evans
ATTORNEY

WITNESS:

Patented Apr. 17, 1923.

1,452,464

UNITED STATES PATENT OFFICE.

SEBRIGHT B. ISAACS, OF KANSAS CITY, MISSOURI.

SPOON.

Application filed March 14, 1921. Serial No. 451,994.

*To all whom it may concern:*

Be it known that I, SEBRIGHT B. ISAACS, a citizen of the United States, residing at Kansas City, in the county of Jackson and State of Missouri, have invented new and useful Improvements in Spoons, of which the following is a specification.

My present invention has reference to a culinary implement.

My object is to produce a culinary implement or kitchen utensil which may be employed as a cake turner, a beater, a means for separating the yolk from the white of an egg, and as a mixing spoon.

The drawing illustrates a satisfactory embodiment of the improvement reduced to practice.

In the drawings:—

Figure 1:
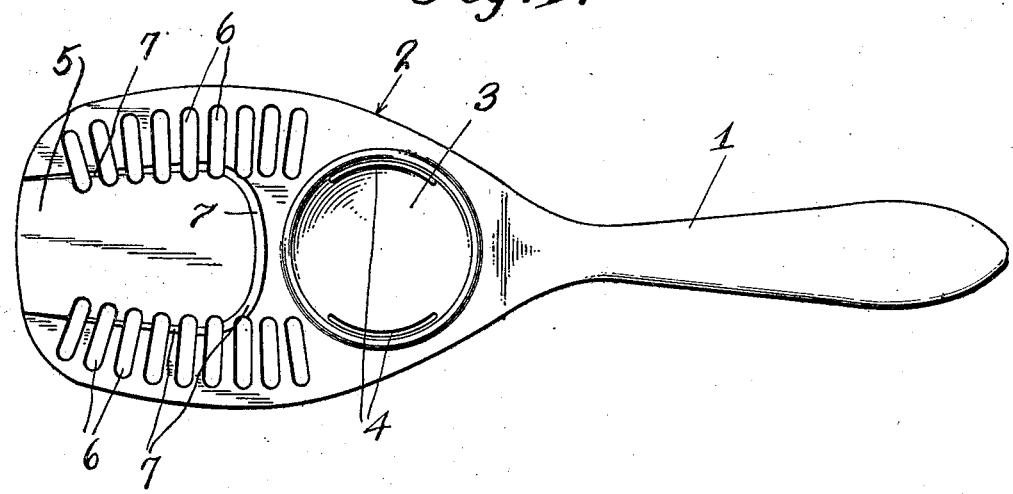
Figure 1 is a plan view of the improvement.
Figure 2:
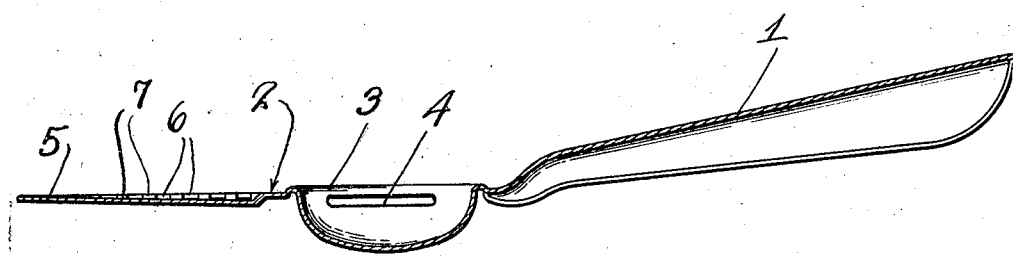
Fig. 2 is a sectional view taken longitudinally therethrough.

My improvement comprises a rolled handle 1 that is integrally formed at one of its ends with a widened extension 2. This extension, at the portion thereof adjacent to the handle, is centrally depressed to form a cup-like receptacle 3, and the opposed walls provided by the receptacle have arcuate openings 4 therethrough. The receptacle 3 provides a means whereby the yolk can be separated from the white of an egg. By breaking the egg into the receptacle, the yolk will remain therein, while the white will pass through the arcuate openings 4 and be received in a suitable utensil disposed below the device for this purpose. Outward of the cup 3, the widened portion 2 is centrally formed with a flat depression 5, which provides a plate slightly below the surface of the extension 2 and which is employed for lifting and turning cakes, the wall of the said depression being shown as at 7 the extension 2 being depressed as at 5, for reinforcing the same. The widened portion 2, to the sides of the blade may be provided with transversely disposed elongated openings 6. This portion of the device provides both an egg beater and a means whereby materials may be effectively mixed.

The bottom portion of the cup 3 provides a fulcrum point or balancing support for the implement when it is desired to loosen food stuff in the turning or the gathering thereof from cooking utensils. The cup 3 can also be employed as a collection chamber for grease and the like when the implement is utilized for the lifting or turning of food stuff.

It is believed that the foregoing description, when taken in connection with the drawings will fully set forth the construction and advantages of the improvement to those skilled in the art to which such inventions relate.

Having described the invention, I claim:—

A culinary implement of the character described comprising a rolled handle, a widened extension formed integrally therewith and adjacent one end thereof, a flat blade formed on the end of the widened extension opposing the handle and designed to be below the surface of the extension, as and for the purpose specified.

In testimony whereof I affix my signature.

SEBRIGHT B. ISAACS.